United States Patent
Keromnes

(10) Patent No.: US 8,609,781 B2
(45) Date of Patent: Dec. 17, 2013

(54) MIXTURE OF PEROXIDES FOR CROSSLINKING ELASTOMERS

(75) Inventor: Laurent Keromnes, Grigny (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/054,542

(22) PCT Filed: Jul. 16, 2009

(86) PCT No.: PCT/FR2009/051405
§ 371 (c)(1),
(2), (4) Date: Mar. 14, 2011

(87) PCT Pub. No.: WO2010/007315
PCT Pub. Date: Jan. 21, 2010

(65) Prior Publication Data
US 2011/0152446 A1  Jun. 23, 2011

(30) Foreign Application Priority Data
Jul. 18, 2008  (FR) ........................................ 08 04112

(51) Int. Cl.
*C08L 31/04* (2006.01)
*C09K 3/00* (2006.01)

(52) U.S. Cl.
USPC ...... 525/328.8; 524/557; 525/61; 252/182.23

(58) Field of Classification Search
USPC ..................... 525/326.1, 329.5, 383, 328, 61; 524/557; 252/182.23
See application file for complete search history.

(56) References Cited

U.S. PATENT DOCUMENTS

| | | | | |
|---|---|---|---|---|
| 5,447,576 A | * | 9/1995 | Willis | 136/259 |
| 5,516,558 A | * | 5/1996 | O'Brien | 427/387 |
| 6,150,479 A | * | 11/2000 | Klemarczyk et al. | 526/90 |
| 2005/0222374 A1 | * | 10/2005 | Muller et al. | 528/272 |

FOREIGN PATENT DOCUMENTS

EP  1251143  10/2002

* cited by examiner

*Primary Examiner* — Ling Choi
*Assistant Examiner* — Chun-Cheng Wang
(74) *Attorney, Agent, or Firm* — Lynn B. Morreale

(57) ABSTRACT

The present invention relates to a mixture including at least O,O-tert-butyl-O-(2-ethylhexyl) monoperoxycarbonate and at least O,O-tert-amyl-O-2-ethylhexyl monoperoxycarbonate, where the O,O-tert-amyl-O-2-ethylhexyl monoperoxycarbonate is present in the mixture in an amount of from 0.001% to 45% by weight relative to the total weight of the mixture. The invention also relates to a crosslinkable composition that includes such a peroxide mixture and an elastomer; and to uses of the crosslinkable composition and mixture.

11 Claims, No Drawings

MIXTURE OF PEROXIDES FOR CROSSLINKING ELASTOMERS

CROSS-REFERENCE TO RELATED APPLICATIONS

This application is a national stage application under 35 U.S.C. §371 of PCT/FR2009/051405, filed Jul. 16, 2009, which claims benefit to French application FR 0804112, filed on Jul. 18, 2008, which are both hereby incorporated by reference.

FIELD OF THE INVENTION

The present invention relates to a peroxide mixture that is useful in particular for crosslinking ethylene-vinyl acetate (EVA) copolymers. The present invention also relates to a crosslinkable composition comprising an ethylene-vinyl acetate copolymer and such a peroxide mixture. The present invention also relates to a process for crosslinking ethylene-vinyl acetate (EVA) copolymers.

BACKGROUND OF THE INVENTION

It is known practice to crosslink ethylene-vinyl acetate (EVA) copolymers by placing these copolymers in the presence of free-radical-initiating peroxides such as O,O-tert-butyl-O-(2-ethylhexyl) monoperoxycarbonate.

However, the crosslinking times obtained via such processes are long. This results in a loss of productivity for the industries that transform these elastomers into finished products.

Moreover, it is important, during a process of crosslinking of an ethylene-vinyl acetate (EVA) copolymer, to maintain a good crosslinking density. Specifically, the crosslinking density is an indication of the mechanical properties of the finished product. Thus, if the crosslinking density is too low, the finished product may be characterized by a breaking strength and a tear strength that are too low.

There is thus still a need for a mixture for facilitating crosslinking for crosslinkable compositions of elastomeric polymers such as ethylene-vinyl acetate (EVA) copolymers, in particular for the purpose of rapidly manufacturing finished products based on ethylene-vinyl acetate (EVA) copolymer elastomers, while at the same time maintaining a good crosslinking density. There is also still a need for a process for crosslinking such crosslinkable compositions, which has an improved rate of reaction while at the same time maintaining a good crosslinking density.

The Applicant has now discovered, surprisingly, that by using a particular mixture of peroxides, with a particular content for at least one of these peroxides, it is possible to crosslink ethylene-vinyl acetate (EVA) copolymers rapidly while at the same time maintaining a good crosslinking density.

BRIEF SUMMARY OF THE INVENTION

The present invention relates to a mixture, especially for facilitating the crosslinking of ethylene-vinyl acetate (EVA) copolymers, comprising a particular peroxide mixture, one of these peroxides being in minor proportion relative to the other peroxide. Thus, a first aspect of the invention relates to a mixture comprising at least O,O-tert-butyl-O-(2-ethylhexyl) monoperoxycarbonate and at least O,O-tert-amyl-O-2-ethylhexyl monoperoxycarbonate, characterized in that the said O,O-tert-amyl-O-2-ethylhexyl monoperoxy-carbonate is present in the mixture in a content ranging from 0.001% to 45% by weight relative to the total weight of the mixture.

The combination of the two peroxides O,O-tert-butyl-O-(2-ethylhexyl) monoperoxycarbonate and O,O-tert-amyl-O-2-ethylhexyl monoperoxycarbonate, in a particular content ranging from 0.001% to 45% by weight relative to the total weight of the mixture for the O,O-tert-amyl-O-2-ethylhexyl monoperoxycarbonate, in the mixtures of the invention makes it possible to increase the rate of reaction when the crosslinking of the ethylene-vinyl acetate (EVA) copolymer is performed in the presence of the mixture according to the invention, in particular relative to a crosslinking process in which only O,O-tert-butyl-O-(2-ethylhexyl) monoperoxycarbonate is used.

Another aspect of the present invention relates to a crosslinkable composition comprising at least one ethylene-vinyl acetate (EVA) copolymer and a mixture as defined above.

The present invention also relates to a process for crosslinking a composition comprising at least one ethylene-vinyl acetate copolymer, comprising at least the step of reacting the said ethylene-vinyl acetate copolymer with a mixture as defined above.

The process according to the invention makes it possible to obtain a higher reaction rate, and thus faster crosslinking of the ethylene-vinyl acetate copolymers, while at the same time maintaining a good crosslinking density. Thus, the finished products, based on ethylene-vinyl acetate copolymers, crosslinked according to the process according to the invention have a high breaking stress and a high modulus.

Thus, another aspect of the present invention relates to the use of a mixture as defined above for increasing the rate of crosslinking in a process for crosslinking ethylene-vinyl acetate copolymer.

Another aspect of the present invention relates to a process for manufacturing a film, characterized in that it comprises at least the following steps:
 a) extrusion in the form of a film of a crosslinkable composition as defined above,
 b) crosslinking of the said crosslinkable composition during or after the said extrusion step a).

DETAILED DESCRIPTION OF CERTAIN EMBODIMENTS OF THE INVENTION

The mixture according to the invention comprises at least O,O-tert-butyl-O-(2-ethylhexyl) monoperoxycarbonate (TBEC). This compound is commercially available under the brand name Luperox® TBEC from the company Arkema.

The mixture according to the invention also comprises O,O-tert-amyl-O-2-ethylhexyl monoperoxycarbonate (TAEC). This compound is commercially available under the brand name Luperox® TAEC from the company Arkema.

O,O-tert-Amyl-O-(2-ethylhexyl) monoperoxycarbonate (TAEC) is present in the mixture according to the invention in a content ranging from 0.001% to 45% by weight relative to the weight of the mixture. Such a content makes it possible to significantly increase the crosslinking reaction rate of an ethylene-vinyl acetate (EVA) copolymer, relative to the use of O,O-tert-butyl-O-(2-ethylhexyl) monoperoxycarbonate (TBEC) alone, while at the same time conserving a good crosslinking density.

Preferably, the content of O,O-tert-amyl-O-2-ethylhexyl monoperoxycarbonate (TAEC) in the mixture according to the invention ranges from 10% to 35% and more preferably from 15% to 30% by weight relative to the total weight of the mixture.

In one embodiment of the invention, the said mixture consists of the said O,O-tert-butyl-O-(2-ethylhexyl) monoperoxycarbonate and the said O,O-tert-amyl-O-2-ethylhexyl monoperoxycarbonate.

The present invention also relates to a crosslinkable composition comprising at least one ethylene-vinyl acetate (EVA) copolymer and a mixture as defined above.

In one embodiment of the invention, the said ethylene-vinyl acetate (EVA) copolymer is present in the said composition in a content ranging from 85% to 99.5% and preferably from 97% to 99% by weight relative to the weight of the composition.

In one embodiment of the invention, the said mixture is present in the said composition in a content ranging from 0.5% to 5% and preferably from 1% to 3% by weight relative to the weight of the composition.

Ethylene-vinyl acetate (EVA) copolymers that are suitable for use in the present invention are, for example, the ethylene-vinyl acetate copolymers sold, respectively, under the trade names Evatane® 18-150 and Evatane® 40-55 by the company Arkema. The vinyl acetate content of the ethylene-vinyl acetate copolymers that are suitable for use in the present invention may vary: for example, these polymers may have a low content of vinyl acetate or a high content of vinyl acetate.

In one embodiment of the invention, the said crosslinkable composition also comprises at least one antioxidant. For example, the antioxidant is present in the said composition in a content ranging from 0.1% to 3% by weight relative to the weight of the composition.

The antioxidant may be, for example, (1,2-dihydro-2,2,4-trimethylquinoline) (TMQ).

According to the process according to the invention, at least one ethylene-vinyl acetate (EVA) copolymer is reacted with the mixture defined above, for example in the crosslinkable composition defined above.

The process according to the invention makes it possible to manufacture finished products at an increased crosslinking rate. Thus, the process according to the invention allows a gain in productivity for the finished product manufacturer. By virtue of the process according to the invention, it is possible to crosslink films based on ethylene-vinyl acetate copolymers with increased productivity, while maintaining for these films good mechanical properties due to the good crosslinking density.

The examples that follow illustrate the invention.

EXAMPLES

In the following examples:
Luperox® TBEC means: O,O-tert-butyl-O-(2-ethylhexyl) monoperoxycarbonate,
Luperox® TAEC means: O,O-tert-amyl-O-2-ethylhexyl monoperoxycarbonate,
Evatane® 18-150: EVA with 18% vinyl acetate and 150 as Melt Flow Index (MFI) value, measured according to standard ASTM 1238,
Evatane® 40-55: EVA with 40% vinyl acetate and 55 as Melt Flow Index (MFI) value, measured according to standard ASTM 1238,
TMQ: antioxidant (1,2-dihydro-2,2,4-trimethylquinoline).

Example 1

Preparation of an Eva Compound with a Low Content of Vinyl Acetate

The amounts of products indicated in Table I below are weighed out:

TABLE I

Composition of the EVA compound with a low content of vinyl acetate

| Products | Concentration (phr) | Per batch (g) |
| --- | --- | --- |
| Evatane ® 18-150 | 100 | 300 |
| TMQ | 1 | 3 |

A Brabender 350S mixer (EUVR184) is used with the following parameters:
bath nominal temperature=70° C.,
rotor nominal spin speed=50 rpm,
the Evatane® 18-150 (preheated at 80° C. for 1 hour) is added,
after mixing for one minute, the TMQ is added,
the physical drop of the mixture in the container before calendaring takes place between 300 and 360 seconds, at a final temperature not exceeding 90° C. to avoid excessively degrading the polymer.

After mixing: calendaring four times at fine thickness (between 0.5 and 1 mm) and then five times at a thickness of 2 mm to obtain a thin film ready for crosslinking in a press at high temperature.

An EVA compound with a low content of vinyl acetate is obtained.

The following mixtures were then prepared (the proportions in each mixture are given as weight percentages relative to the weight of the mixture):
Mixture A (comparative): 100% Luperox® TBEC,
Mixture B (invention): 85% Luperox® TBEC+15% Luperox® TAEC,
Mixture C (comparative): 50% Luperox® TBEC+50% Luperox® TAEC,
Mixture D (comparative): 15% Luperox® TBEC+85% Luperox® TAEC.

Comparison of the Rheometrical Properties of the Elastomeric Compositions as a Function of the Mixture Used:

248 g of low-content EVA compound obtained in Example 1 are weighed out.

Use of the Brabender 350S mixer (EUVR184) with the following parameters:
bath nominal temperature=70° C.,
rotor nominal spin speed=50 rpm,
pressure=6 bar,
addition of products after 60 seconds of mixing for an incorporation temperature of about 65° C.,
the physical drop of the compound at a final temperature of 70° C. takes place at about 150 seconds.

After mixing: calendaring four times at fine thickness (between 0.5 and 1 mm) and then five times at a thickness of 2 mm.

Measurements comparative to the RPA rheometer at 140° C. were taken just after mixing. These measurements were taken according to standard ASTM D5289A.

$M_H$-$M_L$ (see the definition below) was measured for the following four elastomeric compositions (the proportions in each composition are given as weight percentages relative to the weight of the composition):
Composition A (comparative): 1.5% mixture A+98.5% low-content EVA compound of Example 1,
Composition B (invention): 1.5% mixture B+98.5% low-content EVA compound of Example 1,
Composition C (comparative): 1.5% mixture C+98.5% low-content EVA compound of Example 1,
Composition D (comparative): 1.5% mixture D+98.5% low-content EVA compound of Example 1.

The results are collated in Table II below:

TABLE II

Measurement of $M_H$-$M_L$

| RPA 2000 at 150° C. | Composition A | Composition B | Composition C | Composition D |
|---|---|---|---|---|
| $M_H$-$M_L$ (dN · m) | 15.4 | 15.3 | 14.3 | 11.6 |

RPA: rheometer from the company Alpha Technologies
$M_H$-$M_L$: Maximum torque-minimum torque (in dN · m)

An $M_H$-$M_L$ of less than 15 does not make it possible to obtain a good crosslinking density for the finished product: this excessively low density will give rise to an excessively low breaking strength and an excessively high elongation, which is synonymous with excessive deformation of the crosslinked article.

Thus, when the peroxide mixture used comprises, for example, 50% or even 85% of Luperox® TAEC, the finished product has the following drawbacks: excessively low breaking strength and tear strength.

$t_{90}$, $t_2$ and Speed S' max. according to the following definitions, were then measured for compositions A and B:
$t_{90}$: crosslinking time or time required to reach 90% of the value $M_H$-$M_L$ (in minutes),
$t_{s2}$: scorch time or moment when the value $M_L$+2 (minimum torque+2) is reached (in minutes),
Speed S' max.: (crosslinking speed (in dN.m/min).

The $t_{90}$ and the Speed S' max. are directly linked to the productivity since a low $t_{90}$ value means that the crosslinking is rapid, just, as a high Speed S' max. value indicates rapid crosslinking. The results are collated in Table III below:

TABLE III

| RPA 2000 at 150° C. | Composition A (comparative) | Composition B (invention) |
|---|---|---|
| $t_{90}$ (min:ss) | 9:30 | 8:58 |
| $t_{s2}$ (min:ss) | 01:33 | 01:28 |
| Speed S' max. (dN · m/min) | 3.73 | 3.85 |

Thus, with composition B according to the invention, comprising the peroxide mixture according to the invention, a gain in $t_{90}$ of about 6% is obtained. The $t_{s2}$ is also reduced by 5 seconds, which means that the extrusion of the film cannot be accelerated without risk of scorching in the extruder. The Speed S' max. value is increased, the consequence of which is an increased rate of crosslinking in the press and thus better productivity.

Thus, the composition according to the invention allows a gain in productivity compared with the compositions of the prior art.

The mechanical properties of finished products such as plaques (plaque A (comparative) and plaque B (invention)), obtained with the comparative composition A and composition B according to the invention, were then compared.

Each plaque was cured for 30 minutes at 140° C.

The measurements are taken on the crosslinked plaques using an Instron tensile testing machine (speed 500 mm/minute/specimen H2).

These measurements are taken according to standard ASTM D412.

The moduli at 50%, at 100%, at 200% and at 300%, respectively, were measured for plaques A and B. The results are collated in Table IV below (the standard deviations are given in parentheses).

TABLE IV

| | Modulus | | | |
|---|---|---|---|---|
| | 50% modulus (MPa) | 100% modulus (MPa) | 200% modulus (MPa) | 300% modulus (MPa) |
| Plaque A | 1.3 (0.1) | 1.4 (0.1) | 2.2 (0.1) | 2.3 (0.1) |
| Plaque B | 1.6 (0.3) | 1.7 (0.3) | 2.3 (0.2) | 2.5 (0.3) |

The moduli obtained with the plaque prepared the composition according to the invention (plaque B) are better than those obtained with the plaque prepared with the composition according to the prior art (plaque A). Larger moduli mean that it is more difficult to deform these crosslinked plaques and that they are therefore characterized by greater dimensional stability.

Example 2

Preparation of an Eva Compound with a High Content of Vinyl Acetate

The amounts of products indicated in Table V below are weighed out:

TABLE V

Composition of the EVA compound with a high content of vinyl acetate

| Products | Concentration (phr) | Per batch (g) |
|---|---|---|
| Evatane ® 40-55 | 100 | 300 |
| TMQ | 1 | 3 |

A Brabender 350S mixer (EUVR184) is used with the following parameters:
bath nominal temperature=50° C.,
rotor nominal spin speed=50 rpm,
the Evatane® 40-55 (preheated at 80° C. for 1 hour) is added,
after mixing for one minute, the TMQ is added,
the physical drop of the mixture takes place between 300 and 360 seconds, at a final temperature not exceeding 90° C. to avoid excessively degrading the polymer.

After mixing: calendaring four times at fine thickness (between 0.5 and 1 mm) and then five times at a thickness of 2 mm to obtain a thin film ready for crosslinking in a press at high temperature.

An EVA compound with a high content of vinyl acetate is obtained.

The following mixtures, identical to those of Example 1, were then prepared (the proportions in each mixture are given as weight percentages relative to the weight of the mixture):
Mixture A (comparative): 100% Luperox® TBEC,
Mixture B (invention): 85% Luperox® TBEC+15% Luperox® TAEC,
Mixture C (comparative): 50% Luperox® TBEC+50% Luperox® TAEC,
Mixture D (comparative): 15% Luperox® TBEC+85% Luperox® TAEC.

Comparison of the Rheometrical Properties of the Elastomeric Compositions as a Function of the Mixture Used:

248 g of high-content EVA compound obtained in Example 2 are weighed out.

Use of the Brabender 350S mixer (EUVR184) with the following parameters:
bath nominal temperature=50° C., rotor nominal spin speed=50 rpm,
pressure=6 bar,
addition of products after 60 seconds of mixing for an incorporation temperature of about 65° C.,
the drop of the compound at a final temperature of 70° C. takes place at about 150 seconds.

After mixing: calendaring four times at fine thickness (between 0.5 and 1 mm) and then five times at a thickness of 2 mm.

Measurements comparative to the RPA rheometer (from the company Alpha Technologies) at 140° C. were taken just after mixing. These measurements were taken according to standard ASTM D5289A.

$M_H$-$M_L$ was measured for the following four elastomeric compositions (the proportions in each composition are given as weight percentages relative to the weight of the composition):

Composition A1 (comparative): 1.5% mixture A+98.5% high-content EVA compound of Example 1,
Composition B1 (invention): 1.5% mixture B+98.5% high-content EVA compound of Example 1,
Composition C1 (comparative): 1.5% mixture C+98.5% high-content EVA compound of Example 1,
Composition D1 (comparative): 1.5% mixture D+98.5% high-content EVA compound of Example 1.

The results are collated in Table VI below:

TABLE VI

| | Measurement of $M_H$-$M_L$ | | | |
|---|---|---|---|---|
| RPA 2000 at 140° C. | Composition A1 | Composition B1 | Composition C1 | Composition D1 |
| $M_H$-$M_L$ (dN · m) | 26.5 | 25.4 | 22.6 | 20.1 |

An $M_H$-$M_L$ of less than 25 does not make it possible to obtain a good crosslinking density for the finished product: this excessively low density will give rise to an excessively low breaking strength and an excessively high elongation, which is synonymous with excessive deformation of the crosslinked article.

Thus, when the peroxide mixture used comprises, for example, 50% or even 85% of Luperox® TAEC, the finished product has the following drawbacks: excessively low breaking strength and tear strength.

$t_{90}$, $t_2$ and Speed S' max. were then measured for compositions A1 and B1. The $t_{90}$ and the Speed S' max. are directly linked to the productivity since a low $t_{90}$ value means that the crosslinking is rapid, just as a high Speed S' max. value indicates rapid crosslinking. The results are collated in Table VII below:

TABLE VII

| RPA 2000 at 140° C. | Composition A1 (comparative) | Composition B1 (invention) |
|---|---|---|
| $t_{90}$ (min:ss) | 8:12 | 7:39 |
| $t_{s2}$ (min:ss) | 00:45 | 00:42 |
| Speed S' max. (dN · m/min) | 10.20 | 11.90 |

Thus, with composition B1 according to the invention, comprising the peroxide mixture according to the invention, a gain in $t_{90}$ of about 7% is obtained. The $t_{s2}$ is also reduced by 3 seconds, which means that the extrusion of the film cannot be accelerated without risk of scorching in the extruder. The Speed S' max. value is increased, the consequence of which is an increased rate of crosslinking under the press and thus better productivity.

Thus, the composition according to the invention allows a gain in productivity compared with the compositions of the prior art.

The mechanical properties of finished products such as plaques (plaque A1 (comparative) and plaque B1 (invention)), obtained with the comparative composition A1 and composition B1 according to the invention, were then compared.

Each plaque was cured for 30 minutes at 140° C.

The measurements are taken on the crosslinked plaques using an Instron tensile testing machine (speed 500 nm/minute/specimen H2).

These measurements are taken according to standard ASTM D412.

The moduli at 50%, at 100%, at 200% and at 300%, respectively, were measured for plaques A1 and B1. The results are collated in Table VIII below (the standard deviations are given in parentheses).

TABLE VIII

| | Modulus | | | |
|---|---|---|---|---|
| | 50% modulus (MPa) | 100% modulus (MPa) | 200% modulus (MPa) | 300% modulus (MPa) |
| Plaque A1 | 2.3 (0.1) | 2.5 (0.1) | 3.1 (0.1) | 2.3 (0.1) |
| Plaque B1 | 3.6 (0.5) | 4.0 (0.5) | 4.7 (0.5) | 4.9 (0.5) |

The moduli obtained with the plaque prepared the composition according to the invention (plaque B1) are better than those obtained with the plaque prepared with the composition according to the prior art (plaque A1). Larger moduli mean that it is more difficult to deform these crosslinked plaques and that they are therefore characterized by greater dimensional stability.

What is claimed is:

1. A mixture comprising O,O-tert-butyl-O-(2-ethylhexyl) monoperoxycarbonate and O,O-tert-amyl-O-(2-ethylhexyl) monoperoxycarbonate, wherein the O,O-tert-amyl-O-(2-ethylhexyl) monoperoxycarbonate is present in the mixture in an amount of from 10% to 35% by weight relative to the total weight of the mixture.

2. The mixture of claim 1, wherein the amount of the O,O-tert-amyl-O-(2-ethylhexyl) monoperoxycarbonate is present in an amount of from 15% to 30% by weight relative to the total weight of the mixture.

3. The mixture of claim 1, wherein the mixture consists of the O,O-tert-butyl-O-(2-ethylhexyl) monoperoxycarbonate and the O,O-tert-amyl-O-(2-ethylhexyl) monoperoxycarbonate.

4. The mixture of claim 3, wherein the amount of the O,O-tert-amyl-O-(2-ethylhexyl) monoperoxycarbonate is present in an amount of from 10% to 35% by weight relative to the total weight of the mixture.

5. A crosslinkable composition comprising at least one ethylene vinyl acetate copolymer and the mixture of claim 1, wherein the ethylene-vinyl acetate copolymer is present in the composition in an amount of from 85% to 99.5% by weight relative to the weight of the composition.

6. The crosslinkable composition of claim 5, further comprising at least one antioxidant.

7. The crosslinkable composition of claim 6, wherein the antioxidant is present in the composition in an amount of from 0.1% to 3% by weight relative to the weight of the composition.

8. A method of of increasing the rate of crosslinking comprising combining at least the mixture of claim 1 and at least one ethylene-vinyl acetate copolymer to form a crosslinkable composition, wherein the ethylene-vinyl acetate copolymer is present in the crosslinkable composition in an amount of from 85% to 99.5% by weight relative to the weight of the composition, and wherein the amount of the O,O-tert-amyl-O-(2-ethylhexyl) monoperoxycarbonate is present in an amount of from 10% to 35% by weight relative to the total weight of the mixture.

9. A process for crosslinking comprising at least the step of reacting a composition comprising a) at least one ethylene-vinyl acetate copolymer, b) O,O-tert-butyl-O-(2-ethylhexyl) monoperoxycarbonate and c) O,O-tert-amyl-O-2-ethylhexyl monoperoxycarbonate, wherein the amount of O,O-tert-amyl-O-2-ethylhexyl monoperoxycarbonate is from 10% to 35% by weight relative to the total weight of the O,O-tert-butyl-O-(2-ethylhexyl) monoperoxycarbonate and O,O-tert-amyl-O-2-ethylhexyl monoperoxycarbonate in the composition.

10. The process of claim 9, wherein the ethylene-vinyl acetate copolymer is present in the composition in an amount of from 85% to 99.5% by weight relative to the weight of the composition.

11. A process for manufacturing a film comprising the steps of: a) extruding into a film a crosslinkable composition comprising at least one ethylene-vinyl acetate copolymer, O,O-tert-butyl-O-(2-ethylhexyl) monoperoxycarbonate and O,O-tert-amyl-O-(2-ethylhexyl) monoperoxycarbonate, wherein the amount of O,O-tert-amyl-O-(2-ethylhexyl) monoperoxycarbonate is from 10% to 35% by weight relative to the total weight of the O,O-tert-butyl-O-(2-ethylhexyl) monoperoxycarbonate and O,O-tert-amyl-O-(2-ethylhexyl) monoperoxycarbonate in the composition; and b) crosslinking the composition during or after the extrusion step.

\* \* \* \* \*